US010268898B1

(12) United States Patent
Wills et al.

(10) Patent No.: US 10,268,898 B1
(45) Date of Patent: Apr. 23, 2019

(54) SYSTEMS AND METHODS FOR DETERMINING A SAMPLE FRAME ORDER FOR ANALYZING A VIDEO VIA SEGMENTS

(71) Applicant: GOPRO, INC., San Mateo, CA (US)

(72) Inventors: Jonathan Wills, San Mateo, CA (US);
Daniel Tse, San Mateo, CA (US);
Desmond Chik, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 137 days.

(21) Appl. No.: 15/271,998

(22) Filed: Sep. 21, 2016

(51) Int. Cl.
*G06K 9/00* (2006.01)
(52) U.S. Cl.
CPC ..... *G06K 9/00758* (2013.01); *G06K 9/00718* (2013.01); *G06K 9/00765* (2013.01)
(58) Field of Classification Search
CPC ........... G06K 9/00758; G06K 9/00718; G06K 9/00765
See application file for complete search history.

(56) References Cited

U.S. PATENT DOCUMENTS

| 6,633,685 | B1 | 10/2003 | Kusama |
| 7,222,356 | B1 | 5/2007 | Yonezawa |
| 7,296,231 | B2 * | 11/2007 | Loui ................. G06F 17/30802 348/584 |
| 7,483,618 | B1 | 1/2009 | Edwards |
| 7,512,886 | B1 | 3/2009 | Herberger |
| 7,885,426 | B2 | 2/2011 | Golovchinsky |
| 7,970,240 | B1 | 6/2011 | Chao |
| 8,180,161 | B2 | 5/2012 | Haseyama |
| 8,396,878 | B2 | 3/2013 | Acharya |
| 8,446,433 | B1 | 5/2013 | Mallet |

(Continued)

FOREIGN PATENT DOCUMENTS

| JP | H09181966 A | 7/1997 |
| JP | 2005252459 A | 9/2005 |

(Continued)

OTHER PUBLICATIONS

PCT International Search Report and Written Opinion for PCT/US2015/023680, dated Oct. 6, 2015, 13 pages.

(Continued)

*Primary Examiner* — Menatoallah Youssef
(74) *Attorney, Agent, or Firm* — Sheppard Mullin Richter & Hampton LLP

(57) ABSTRACT

System and/or method configured to determine a sample frame order for analyzing a video. The video may have multiple frames ordered in a sequence from a beginning to an end. Segments of the video may be determined based on an analysis of the frames of the video. A first sample frame order for analyzing the video may be determined based on multiple iterations performed on individual ones of the segments of the video. Determining the first sample frame order may include determining initial frames for a first iteration, and determining secondary frames for a second iteration based on a function of frame position in the sequence of frames. The initial frames and the secondary frames may be associated with sample positions in the sample frame order. A first feature of the video may be determined based on an analysis of the frames performed in the first sample frame order.

20 Claims, 6 Drawing Sheets

(56) References Cited

U.S. PATENT DOCUMENTS

| | | |
|---|---|---|
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1* | 4/2010 | Liu ............... G11B 27/034 386/241 |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1 | 12/2011 | Deever |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | David McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0358603 A1 | 12/2016 | Azam |
| 2016/0366330 A1 | 12/2016 | Boliek |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |

(56) References Cited

FOREIGN PATENT DOCUMENTS

| WO | 2012057623 A1 | 5/2012 |
| WO | 2012086120 A1 | 6/2012 |

OTHER PUBLICATIONS

Ernoult, Emeric, "How to Triple Your YouTube Video Views with Facebook", SocialMediaExaminer.com, Nov. 26, 2012, 16 pages.

PCT International Preliminary Report on Patentability for PCT/US2015/023680, dated Oct. 4, 2016, 10 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US20151041624, dated Dec. 17, 2015, 7 pages.

PCT International Search Report and Written Opinion for PCT/US15/12086 dated Mar. 17, 2016, 20 pages.

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al. Deep Compression: Compressing Deep Neural Networks with Pruning, Trained Quantization and Huffman Coding, International Conference on Learning Representations 2016, 14 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding_html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Japanese Office Action for JP Application No. 2013-140131, dated Aug. 5, 2014, 6 pages.

Office Action for U.S. Appl. No. 13/831,124, dated Mar. 19, 2015, 14 pages.

PSonar URL: http://www.psonar.com/about retrieved on Aug. 24, 2016, 3 pages.

\* cited by examiner

SYSTEMS AND METHODS FOR DETERMINING A SAMPLE FRAME ORDER FOR ANALYZING A VIDEO VIA SEGMENTS

This disclosure relates to systems and methods for determining a sample frame order for analyzing a video.

BACKGROUND

Videos comprise a number of video frames ordered in a sequence. Longer videos typically include several video frames. Analyzing a video to generate and/or determine information related to the video typically requires a sequential analysis of each frame of the video until the entire video is processed. As such, an output representing the entire video is only fully realized once every frame has been processed.

Typically, for some types of video, content may be captured continuously (e.g., without user controlled cuts and/or transitions) such that it begins recording before of an event and/or experience and may not stop recording until after the event and/or experience has ended. Such continuous capture video content may be long in duration.

SUMMARY

This disclosure relates to determining a sample frame order for analyzing a video having multiple segments. A video may be analyzed to determine one or more features of the video. Typical methods of analyzing a video via a sequential analysis of each frame from beginning to end may impact efficiency of such analysis because the full quantity of frames in a video must be analyzed before obtaining any information representing the full length of the video. This problem may be amplified for videos having longer durations. For example, continuous-capture-type video content. One aspect of the present disclosure describes a multiple iteration technique that progressively samples the full range of a video. The video may be segmented into multiple segments such that the multiple iteration technique for progressively sampling the video may sample one or more frames in individual ones of multiple segments per iteration.

The present disclosure describes determining one or more segments of the video based on an analysis of the video prior to performing the multiple iteration progressive sampling technique. The multiple iteration progressive sampling technique may use breadth first traversal of binary tree(s) to progressively sample the full video in accordance with the determined segments. As such, for individual ones of the iterations and/or at individual depths of traversal, the output and/or analysis of the video may be fully temporally realized and may reflect the various content included in the multiple segments such that it represents the full length and content spectrum of the video. As iterations and/or depth increases, more frames from individual ones of the segments may be included in the sample frame order. This may refine and/or increase fidelity of the information obtained (e.g., features, etc.) for a video via an analysis of the video according to the sample frame order. The analysis of the video may stop at a given iteration and/or depth of traversal. As such, a given number of iterations and/or depth may provide a satisfactory evaluation of the entire video, including the variety of content that may be included in the video, before and/or without analyzing each and every frame sequentially.

A system that determines a sample frame order for analyzing a video may include one or more physical processors and/or other components. The one or more physical processors may be configured by machine-readable instructions. Executing the machine-readable instructions may cause the one or more physical processors to determine a sample frame order for analyzing a video. The machine-readable instructions may include one or more computer program components. The computer program components may include one or more of a video component, a segmentation component, a sample frame order component, an interval component, an analysis component, a feature component, and/or other computer program components.

The video component may be configured to obtain one or more electronic files. The one or more electronic files may define video content included in the video. The video may have multiple frames ordered in a sequence from a beginning to an end.

The segmentation component may be configured to determine segments of the video. The segmentation component may be configured to determine one or more segments of the video based on an analysis of the multiple frames of the video. In some implementations, a first segment, a second segment, and/or other segments may be determined. The first segment may have a first beginning and a first end. The second segment may have a second beginning and a second end. In some implementations, the segments of the video may be determined based on similarity between neighboring frames in the sequence.

The sample frame order component may be configured to determine a first sample frame order for analyzing the video. The first sample frame order may be determined based on multiple iterations performed on individual ones of the segments of the video. The quantity of iterations may indicate a depth of the sample of the video.

Determining the first sample frame order may include determining a first initial frame for a first iteration of the first segment. The sample frame order component may be configured determine the first initial frame based on based on a function of frame position in the sequence of frames between the first beginning of the first segment and the first end of the first segment. The first initial frame may have a first initial frame position in the sequence of frames. In some implementations, the first initial frame position may include a midpoint of the first segment of the video, or a frame adjacent to the midpoint of the first segment of the video. Determining the first sample frame order may include determining a second initial frame for a first iteration of the second segment. The sample frame order component may be configured determine the second initial frame based on based on a function of frame position in the sequence of frames between the second beginning of the second segment and the second end of the second segment. The second initial frame may have a second initial frame position in the sequence of frames. In some implementations, the second initial frame position may include a midpoint of the second segment of the video, or a frame adjacent to the midpoint of the second segment of the video. One or more other initial frames may be determined for one or more other segments of the video.

The sample frame order component may be configured to associate one or more of the first initial frame, the second initial frame, and/or other initial frames with primary sample positions in a first sample frame order. The first sample frame order may be different from the sequence of frames.

Determining the first sample frame order may include determining first secondary frames for a second iteration of the first segment. The sample frame order component may be configured to determine the first secondary frames based on a function of frame position in the sequence of frames between the first beginning of the first segment and the first initial frame position, and/or between the first initial frame position and the first end of the first segment. Determining the first sample frame order may include determining second secondary frames for a second iteration of the second segment. The sample frame order component may be configured to determine the second secondary frames based on a function of frame position in the sequence of frames between the second beginning of the second segment and the second initial frame position, and/or between the second initial frame position and the second end of the second segment. In some implementations, determining the first sample frame order may include determining one or more other secondary frames for a second iteration of one or more other segments.

The first secondary frames may have first secondary frame positions in the sequence of frames. The first secondary frame positions may be located at midpoints between: the first beginning of the first segment and the first initial frame position, and/or the first initial frame position and the first end of the first segment. The second secondary frames may have second secondary frame positions in the sequence of frames. The second secondary frame positions may be located at midpoints between: the second beginning of the second segment and the second initial frame position, and/or the second initial frame position and the second end of the second segment.

The sample frame order component may be configured to associate the first secondary frames, the second secondary frames, and/or other secondary frames with secondary sample positions in the first sample frame order. The secondary sample positions may come after the primary sample positions and/or before any other sample positions in the first sample frame order.

Determining the first sample frame order may include determining first tertiary frames for a third iteration of the first segment, second tertiary frames for a third iteration of the second segment, and/or other tertiary frames for a third iteration of other segments. The first tertiary frames and/or second tertiary frames may be determined based on a function of frame position in the sequence of frames. The sample frame order component may be configured to associate one or more of the first tertiary frames, the second tertiary frames, and/or other tertiary frames determined for other segments of the video with tertiary sample positions in the first sample frame order.

The interval component may be configured to determine an interval between a frame position in the sequence of frames determined for a given iteration and another frame position in the sequence of frames determined for an iteration immediately preceding the given iteration. The interval component may be configured to determine whether the interval is at least equal to or less than a threshold interval.

The analysis component may be configured to analyze the video according to the first sample frame order to determine one or more features of the video. The feature determination component may be configured to determine a first feature of the video. The first feature of the video may be determined based on an analysis of the frames in the video performed on the frames in the first sample frame order. The first feature of the video may include one or more of a goodness score, a motion metric, a shape metric, a face metric, a persistence metric, and/or other features of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
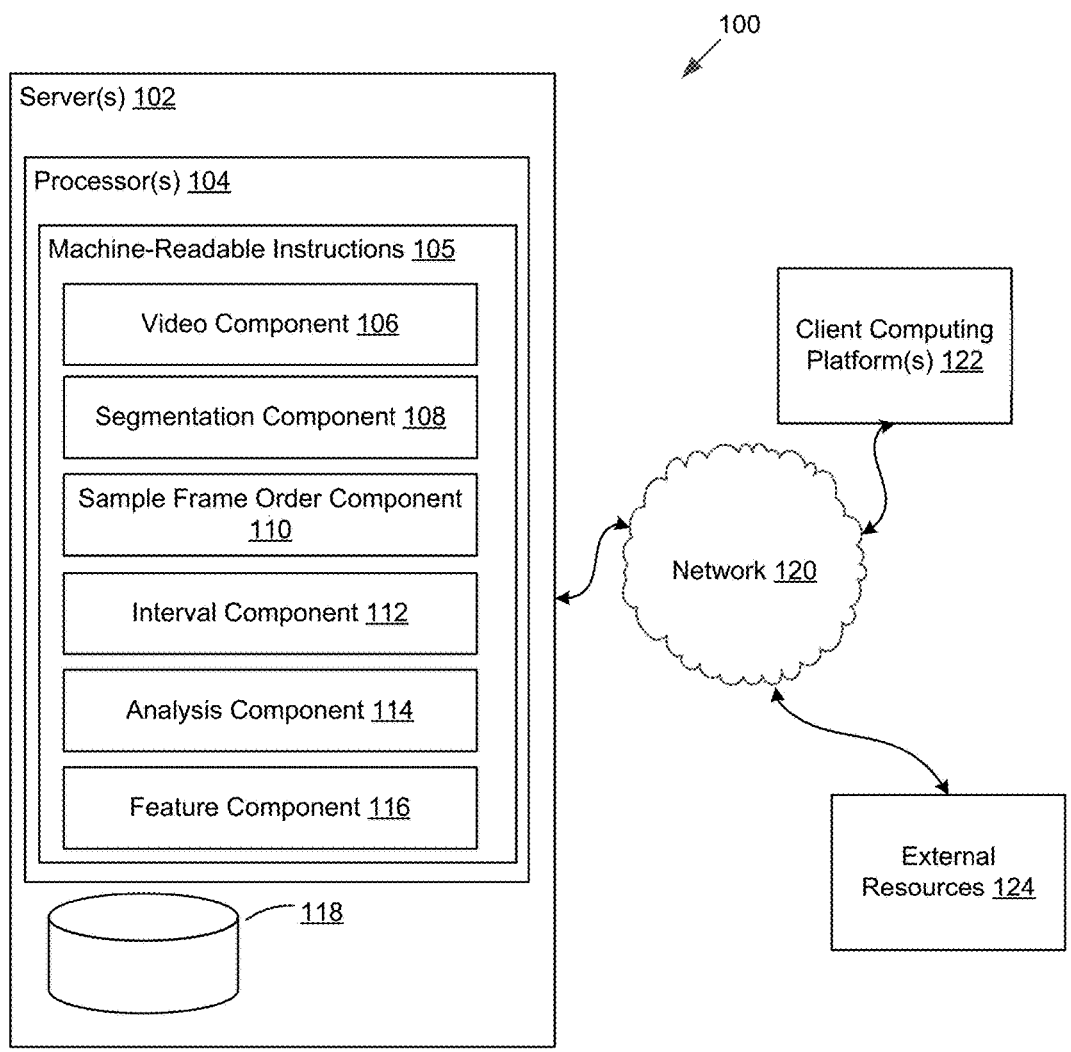
FIG. 1 illustrates a system configured to determine a sample frame order for analyzing a video, in accordance with one or more implementations.

FIG. 1 illustrates a system 100 configured to determine a sample frame order for analyzing a video. Analyzing a video according to a sample frame order may enable an analysis of the full temporal range of the video earlier, and/or without analyzing every frame in the video. In existing methods, the entire sequence of frames must be processed before a fully temporally realized representation of the output can be generated. Determining a sample frame order as described herein may progressively identify sample frames in accordance with segments that represent the full temporal and content range of the video. By way of non-limiting example, content of a video may be substantially similar for large portions of the video and/or change for one or more segments of the video. Determining a progressive sampling of the video without segmenting the video may identify, for one or more iterations, sample frames that are not distinct and do not accurately represent the diverse content included in the video. One aspect of the present application describes segmenting a video and performing a multiple pass technique that may use breadth-first traversal of one or more binary tree(s) representing the segments, to progressively sample the full temporal and/or content range (or a representation of the full temporal and/or content range) of the video and determine the sample frame order. Individual iterations performed may represent a depth of traversal of the one or more binary trees representing the segments of the video. As the number of iterations and/or depth of the traversal increases, the fidelity of the result may be refined and/or increased as more frames of the video are included in the sample frame order. Therefore, the fidelity and/or accuracy of the analysis desired may dictate how many iterations are performed and/or at what depth to stop traversing the tree(s) representing the segments of the videos. In some implementations, the full length of the video and/or every segment (e.g., the full range of content) may be represented by a sample frame order that does not include all of the frames in the video and/or, in some implementations, includes less than half of the frames in the video. As such, analysis of the sample frame order may represent an analysis of the full video before analyzing, or without having to analyze, every frame in the video.

The system 100 may comprise one or more of a server 102, one or more computing platforms 122, and/or other components. Individual computing platforms 122 may include one or more of a cellular telephone, a smartphone, a digital camera, a laptop, a tablet computer, a desktop computer, a television set-top box, smart TV, a gaming console, a client computing platform, and/or other platforms.

The server 102 may include one or more physical processor(s) 104 configured by machine-readable instructions 105. Processor(s) 104 may be configured to provide information processing capabilities in system 100. As such, processor(s) 104 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor(s) 104 may be configured by machine-readable instructions 105. Executing machine-readable instructions 105 may facilitate determining a sample frame order for analyzing a video. Machine-readable instructions 100 may include one or more computer program components. The machine-readable instructions 105 may include one or more of a video component 106, a segmentation component 108, a sample frame order component 110, an interval component 112, an analysis component 114, a feature component 116, and/or other components.

One or more features and/or functions of server 102 may be configured to facilitate generation, obtaining, processing, analyzing, editing, and/or distribution of videos. It is noted that although the present disclosure is directed to videos and/or video clips, one or more other implementations of system 100 and/or server 102 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items. In some implementations, photos may be associated with one or more of multi-shot photo modes, time-lapse modes, and/or burst shot modes of a camera.

Users of system 100 may comprise individuals and/or entities that provide, generate, process, analyze, edit, and/or distribute one or more of videos, video clips, and/or other media items. Individual videos may comprise continuous capture video, a compilation of video clips, and/or other videos. By way of non-limiting example, system 100 may be configured to receive videos captured by users.

Video component 106 may be configured to obtain one or more electronic files that define video content included in the video. The video content my include multiple frames of a video. Video component 106 may be configured to obtain one or more electronic files defining the video content included in the video from one or more or electronic storage 118, client computing platforms 122, external resources 124, and/or other sources. The video content may be captured by one or more capturing devices from which the information defining one or more of the video content, audio content, metadata, and/or other information may be uploaded and/or transmitted to one or more of electronic storage 118, client computing platforms 122, external resources 124, and/or other sources. The video may have multiple frames ordered in a sequence from a beginning to an end. The individual frames within the sequence of frames may have a frame position indicating their location between the beginning of the video and the end of the video.

By way of non-limiting example, videos may be captured using one or more image capturing devices. An image capturing device may include one or more of a computing platform 122, a mobile device (e.g., a smart phone, a tablet, and/or other mobile device), a camera (e.g., an action camera, a sports camera, and/or other type of camera), a video recorder, and/or other device suitable to capture, upload, transmit, edit, and/or distribute videos and/or video clips. To simplify and clarify the present description, image capture devices may be referred to generally as "cameras," however it is to be understood that this is not to be considered limiting as other types of image capture devices may be employed. A given camera may include one or more sensors including one or more a GPS, gyro, compass, accelerometer, temperature sensor, pressure sensor, depth sensor, an image sensor (e.g., an electromagnetic transducer), a sound transducer, and/or other sensors. The cameras may be configured to store and/or transmit information defining one of more videos. The information defining one or more videos may include video content, audio content, metadata, and/or other content included in one or more electronic files. In some implementations, the metadata associated with a video may include one or more of capture settings of one or more capture devices used to capture the video, sensor output of one or more sensors coupled to the one or more capture devices, user-provided information, and/or other information.

In some implementations, server 102 may be configured to provide remote hosting of the features and/or functions of server 102 to one or more computing platforms 122. The one or more computing platforms 122 may be remotely located from the server 102. In some implementations, one or more features and/or functions of server 102 may be attributed as local features and/or functions of one or more computing platforms 122. By way of non-limiting example, individual ones of computing platforms 122 may include machine-readable instructions comprising the same or similar components as machine-readable instructions 105 of server 102. The computing platforms 122 may be configured to locally execute one or more components that may be the same or similar to the components of machine-readable instructions 105.

By way of non-limiting example, one or more features and/or functions attributed to server 102 may be provided at a client-end application that may be installed on a computing platform 122. In some implementations, one or more features and/or functions attributed to server 102 may be configured as a cloud-based application that a user may access via computing platform 122. In some implementations, an application providing one or more features and/or functions attributed herein to server 102 may be configured to be part client-end and part cloud based. Further, it is noted that the one or more computing platforms, servers, and/or other machines executing a client-based application and/or a cloud-based application may comprise one or more of one or more processors, memory storage configured to store and/or execute program code corresponding to the processes described herein, and/or other components.

Electronic storage 118 may include electronic storage medium that electronically stores information. Electronic storage 118 may store software algorithms, information determined by processor 104, information received remotely, and/or other information that enables system 100 to function properly. For example, electronic storage 118 may store information relating to videos, frames, frame positions, sample frame order(s), and/or other information.

Segmentation component 108 may be configured to determine one or more segments of the video. The video may include any number of segments. In some implementations, the number of segments determined for a given video may indicate one or more of an amount of variety of content in the video and/or the length of the video. The one or more segments of the video may be determined based on an analysis of the multiple frames of the video. An analysis of the multiple frames of the video may include an analysis of the quantity of frames, a length of the video, the content included in the multiple frames, and/or other features of the video and/or the multiple frames of the video. In some implementations, by way of non-limiting example, the analysis may include a similarity analysis. The similarity analysis may indicate how similar one or more frames in a video are to one or more other frames (e.g., neighboring frames, etc.) in the video. Similarity may be measured across various dimensions including one or more of visual similarity (e.g. similarity of visual content within neighboring frames), audio similarity (e.g., similarity of audio associated with neighboring frames), semantic similarity (e.g. do neighboring frames exhibit similar objects), emotive similarity (e.g. do neighboring frames evoke similar emotions), data similarity (e.g., similarity of telemetry data from one or more sensors such as an accelerometer, a gyroscope, etc.; similarity of GPS and/or location data; and/or similarity of time data, etc.), and/or other types of similarity.

In some implementations, segmentation component 108 may apply a pair-wise similarity algorithm on neighboring frames sequentially. The result of applying this algorithm may a set of discrete, non-overlapping groups of frames (e.g., forming segments) for sets of similar (e.g., visually, audibly, semantically, emotively, data wise, etc.) frames. If, for example, segments are longer and/or include a larger quantity of frames relative to other videos and/or segments, it may be more likely that the content within a given segment is similar and therefore needs less sampling as the visual information may not change greatly. Determining the sample frame order based on multiple iterations performed on individual ones of the segments of the video may mean, for smaller and/or shorter segments, more frames may be sampled at earlier iterations (e.g., smaller depths). As such, the smaller and/or shorter segments, which may indicate a higher level of diversity and/or variety, may be weighted as more important and/or effectively having more representation, and/or earlier (e.g., earlier iterations and/or at smaller depths) representation, in the sample frame order.

In some implementations, one or more of a first segment, a second segment, a third segment, a fourth segment, a fifth segment, and/or other segments may be determined by segmentation component 108. The one or more segments determine may have a beginning and/or an end. Segmentation component 108 may be configured to determine a first segment having a first beginning and/or a first end. Segmentation component 108 may be configured to determine a second segment having a second beginning and/or a second end.

Segmentation component 108 may be configured to determine segments of the video based on similarity between neighboring frames in the sequence. As such, individual ones of the segments of the video may comprise multiple similar sequential frames. Determining the segments of the video may include determining the similarity between the neighboring frames in the sequence. In some implementations, determining the similarity between neighboring frames in the sequence may include applying a pair-wise similarity algorithm to all neighboring frames sequentially. Based on the determination of the similarity, segmentation component 108 may identify one or more of a transition, change, break, and/or shifting point in the video at which a segment beginning and/or end should be identified.

Figure 2:
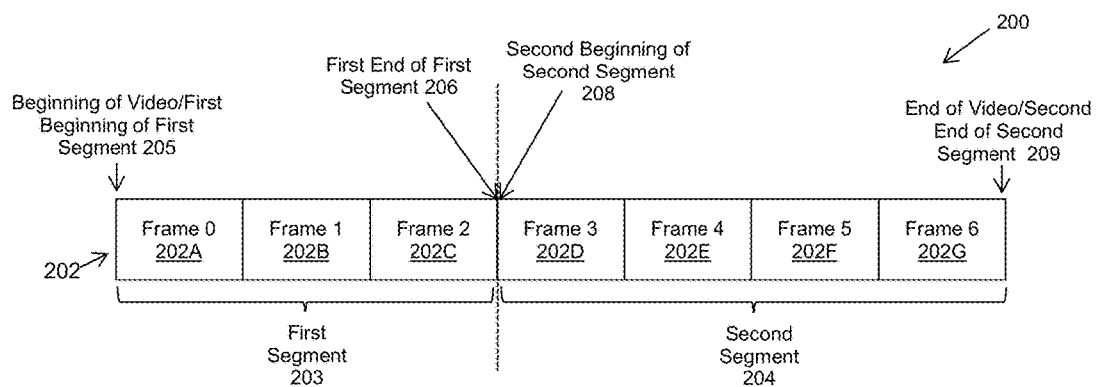
FIG. 2 illustrates sequence of frames for a video having multiple segments, in accordance with one or more implementations.

FIG. 2 illustrates sequence of frames for a video having multiple segments, in accordance with one or more implementations. Video 200 may include may have multiple frames (e.g., 0-6) ordered in a sequence of frames 202. Video 200 may have a beginning 205 and an end 209. A segmentation component (e.g., the same as or similar to segmentation component 108) may be configured to determine one or more segments of video 200. The one or more segments may be determined based on an analysis of the frames in sequence 202. First segment 203 and second segment 204 may be determined. First segment 203 may have three frames, Frame 0, Frame 1, and Frame 2. Frame 0, Frame 1, and Frame 2 may have frame positions 202A-202C in sequence of frames 202 respectively. First segment 203 may include a first beginning of first segment 205 and a first end of first segment 206. First beginning of first segment 205, as illustrated, may be the same as beginning of video 205. Second segment 204 may have a second beginning of second segment 208 and/or a second end of second segment 209. Second segment 204 may have four frames, Frame 3, Frame 4, Frame 5, and Frame 6. Frame 3, Frame 4, Frame 5, and Frame 6 may have frame positions 202D-202G in sequence of frames 202 respectively. The second end of second segment 209 may be the same as end of video 209. In some implementations, first segment 203 may be determined based on frame 0, Frame 1, and/or Frame 2 being similar to each other, and/or having a given degree of similarity. Second segment 204 may be determined based on Frame 3, Frame 4, Frame 5, and/or Frame 6 being similar to each other and/or having a given degree of similarity.

Returning to FIG. 1, sample frame order component 110 may be configured to determine a sample frame order for analyzing a video. The sample frame order may be determined based on multiple iterations performed on individual ones of the segments of videos. The multiple iterations may represent multiple depth passes through the video. At each depth, a pass through the individual ones of the segments of the video may identify one or more sample frames. For example, the further in-depth a pass, the more frames per individual ones of the segments may be identified and associated with sample frame positions in the sample frame order. In some implementations, a first iteration, may be used to identify first initial frames for the individual segments to be associated with a primary sample positions in a sample frame order. Individual iterations after the first iteration may be used to determine one or more frames or sets of frames to add to the sample frame order after the primary sample positions.

Sample frame order component 110 may be configured to determine a sample frame order. For example, a first sample frame order may be determined. Determining a sample frame order may include determining one or more initial frames of the segments based on a function of frame position in the sequence of frames between the beginning of the segment and the end of a the segment. The frames determined for individual ones of the multiple iterations may represent nodes in one or more binary trees. In some implementations, individual ones of the segments may be represented by an individual binary tree. The roots of the individual binary trees may represent the initial frames determined for a first iteration of the individual segments. In some implementations, by way of non-limiting example, a quantity of initial frames may correspond to a quantity of segments determined in the video.

The function of frame position in the sequence of frames may include a midpoint, and/or a frame adjacent to the midpoint, between two or more defined positions in the video. For example, the two defined positions in the video may include one or more of: one or more parent nodes for a given segment (e.g., frames determined during previous iterations of a given segment), the beginning of the video, the beginning of a segment, the end of the video, the end of a segment, and/or another defined position in the video.

Sample frame order component 110 may be configured to determine a first initial frame for the first iteration of the first segment of the video. The first initial frame may have a first initial frame position in the sequence of frames. The first initial frame position may include a midpoint, and/or a frame position adjacent to the midpoint, between the first beginning of the first segment and the first end of the first segment. In some implementations, a first initial frame may be determined for the first iteration of the first segment of the video. The first initial frame may have a first initial frame position in the sequence of frames. The first initial frame position may include a midpoint, and/or a frame position adjacent to the midpoint, between the first beginning of the first segment and the first end of the first segment. Sample frame order component 110 may be configured to determine a second initial frame for the first iteration of the second segment of the video. The second initial frame may have a second initial frame position in the sequence of frames. The second initial frame position may include a midpoint, and/or a frame position adjacent to the midpoint, between the second beginning of the second segment and the second end of the second segment.

As such, in some implementations, determining the first initial frame based on the function of frame position in the sequence of frames between the first beginning of the first segment and the first end of the first segment may include determining a frame in the sequence of frames that is at the midpoint of the first segment and/or immediately adjacent to the midpoint of the first segment. By way of non-limiting example, the first initial frame may represent the root (e.g., level 0) of a first binary tree representing the first segment. Determining the second initial frame based on the function of frame position in the sequence of frames between the second beginning of the second segment and the second end of the second segment may include determining a frame in the sequence of frames that is at the midpoint of the second segment and/or immediately adjacent to the midpoint of the second segment. By way of non-limiting example, the second initial frame may represent the root (e.g., level 0) of a second binary tree representing the second segment.

Figure 3:
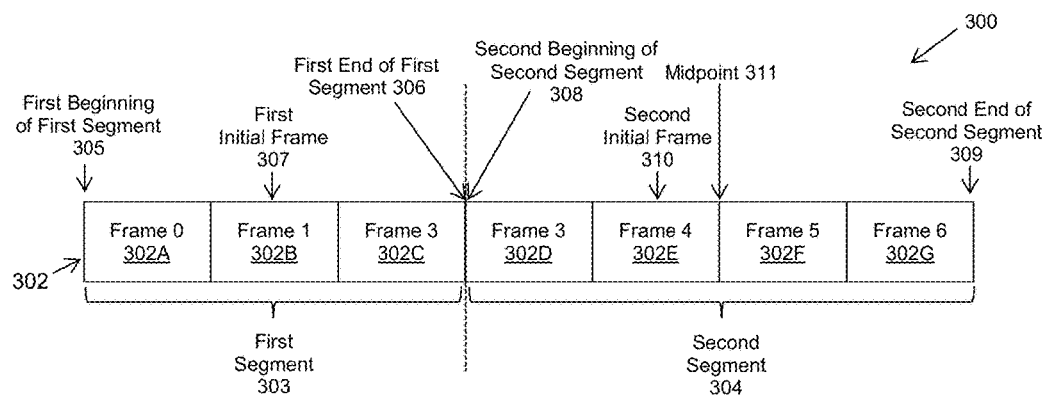
FIG. 3 illustrates initial frames at initial frame positions in the sequence of frames of a video, in accordance with one or more implementations.

FIG. 3 illustrates initial frames at initial frame positions in the sequence of frames of a video, in accordance with one or more implementations. Video 300 may include may have multiple frames 302 ordered in a sequence 301. Video 300 may have a beginning 305 and an end 309. A segmentation component (e.g., the same as or similar to segmentation component 108) may be configured to determine one or more segments of video 300. The one or more segments may be determined based on an analysis of frames 302 in video 300. First segment 303 and second segment 304 may be determined. First segment 303 may have three frames, Frame 0, Frame 1, and Frame 2. Frame 0, Frame 1, and Frame 2 may have frame positions 302A-302C in sequence of frames 202 respectively. First segment 303 may include a first beginning of first segment 305 and a first end of first segment 306. First beginning of first segment 305, as illustrated, may be the same as beginning of video 305. Second segment 304 may have a second beginning of second segment 308 and/or a second end of second segment 309. Second segment 304 may have four frames, Frame 3, Frame 4, Frame 5, and Frame 6. Frame 3, Frame 4, Frame 5, and Frame 6 may have respective frame positions 302D-302G in sequence of frames 302. The second end of second segment 309 may be the same as end of video 309. In some implementations, first segment 303 may be determined based on frame 0 302A, Frame 1 302B, and/or Frame 2 302C being similar to each other, and/or having a given degree of similarity. Second segment 304 may be determined based on Frame 3, Frame 4, Frame 5, and/or Frame 6 being similar to each other and/or having a given degree of similarity.

First initial frame 307 may be determined for a first iteration of first segment 303. First initial frame 307 may be determined based on a function of frame position in sequence of frames 302 between first beginning of the first segment 305 and first end of the first segment 306. First initial frame 307 may have a first initial frame position 302B in sequence of frames 302. The first initial frame position 302B may be located at a midpoint of first segment 303. Second initial frame 310 may be determined for a first iteration of second segment 304. Second initial frame 307 may be determined based on a function of frame position in sequence of frames 302 between a second beginning of the second segment 308 and second end of the second segment 309. Second initial frame 310 may have a second initial frame position 302E in sequence of frames 302. The second initial frame position 302E may be located at adjacent to a midpoint of second segment 304. Because second segment 304 has an even quantity of frames, second initial frame 310 may not have an initial frame position directly located at midpoint 311 of second segment 304. As such, second initial frame 310 may be determined because it is adjacent to midpoint 311 of second segment 304. At least two frames (e.g., Frame 4 and Frame 5) may be located adjacent (e.g., at frame positions 302E and 302F) to midpoint 311. In some implementations, a user may indicate which adjacent frame to designate as second initial frame 310. A user may indicate which adjacent frame to designate as second initial frame 310 via a user setting for multiple segments and/or videos, one or more selections for individual ones of the multiple videos, and/or via other methods.

Returning to FIG. 1, sample frame order component 110 may be configured to associate the initial frames determined for a first iteration of the segments with a primary sample positions in a first sample frame order. The first initial frame, the second initial frame, and/or other initial frames (e.g., for other segments) may be associated with the primary sample positions in the first sample frame order. The primary sample positions may include the first positions and/or the foremost positions within the sample frame order. The first sample frame order may represent an order in which a sample of frames, representing the video, are to be processed and/or analyzed. As such, the frames associated with the primary sample positions may be processed and/or analyzed before frames associated with one or more other sample positions. The sample frame order (e.g., the first sample frame order) may be different from the sequence of frames of the video. A quantity of frames in the sample frame order may differ based on the quantity of iterations performed (e.g., the depth of the sample) and/or the quantity of segments within a video.

Associating one or more frames with one or more sample positions in a sample frame order may include storing information indicating an association of the one or more frames with one or more sample positions in the sample frame order. The information indicating an association may include location information (e.g., a frame position within the sequence of frames), metadata, content information (e.g. indicating the content of the one or more frames, time information (e.g., within the duration of the video), segment information, and/or other information.

Sample frame order component 110 may be configured to determine one or more secondary frames based on a function of frame position in the sequence of frames between the beginning of a given segment and the initial frame position of the given segment, between the initial frame position of the given segment and the end of the given segment, and/or between any other defined positions in the given segment and/or the video. In some implementations, the secondary frames may be determined for a second iteration of the segments. The secondary frames may include first secondary frames, second secondary frames, and/or other secondary frames.

The first secondary frames may be determined for a second iteration of the first segment. Sample frame order component 110 may be configured to determine the first secondary frames based on a function of frame position in the sequence of frames between the first beginning of the first segment and the first initial frame position, between the first initial frame position and the first end of the first segment, and/or between any other defined positions in the first segment and/or the video.

The second secondary frames may be determined for a second iteration of the second segment. Sample frame order component 110 may be configured to determine the second secondary frames based on a function of frame position in the sequence of frames between the second beginning of the second segment and the second initial frame position, between the second initial frame position and the second end of the second segment, and/or between any other defined positions in the second segment and/or the video.

The first secondary frames may have first secondary frame positions in the sequence of frames. The first secondary frame positions may be located at, or adjacent to, midpoints between: the first beginning of the first segment and the first initial frame position, and the first initial frame position and the first end of the first segment. The second secondary frames may have second secondary frame positions in the sequence of frames. The second secondary frame positions may be located at, or adjacent to, midpoints between: the second beginning of the second segment and the second initial frame position, and the second initial frame position and the second end of the second segment.

In some implementations, determining the first secondary frames based on a function of frame position in the sequence of frames between the first beginning of the first segment and the first initial frame position, and/or between the first initial frame position and the first end of the first segment, may include determining a frame in the sequence of frames for the first segment that is at one or more secondary midpoints between the beginning of the first segment and the initial frame position for the first segment, and/or between the initial frame position and the end of the video. By way of non-limiting example, the one or more first secondary frames may represent a first level of the binary tree for the first segment. The one or more first secondary frames may be child nodes of the root node in the first binary tree representing the first segment. Determining the second secondary frames based on a function of frame position in the sequence of frames between the second beginning of the second segment and the second initial frame position, and/or between the second initial frame position and the second end of the second segment, may include determining a frame in the sequence of frames for the second segment that is at one or more secondary midpoints between the beginning of the second segment and the initial frame position for the second segment, and/or between the initial frame position and the end of the video. By way of non-limiting example, the one or more second secondary frames may represent a first level of the binary tree for the second segment. The one or more second secondary frames may be child nodes of the root node in the second binary tree representing the second segment. In some implementations, as depth of the sample increases, the quantity of the frames in the sample frame order and/or the quantity of frames determined for a given iteration of a given segment may increase. By way of example, individual nodes in the binary tree (e.g., representing individual frames included in the same frame order) determined for individual iterations may, if iterations continue, have one or two child nodes determined for an immediately subsequent iteration of a given segment.

Figure 4:
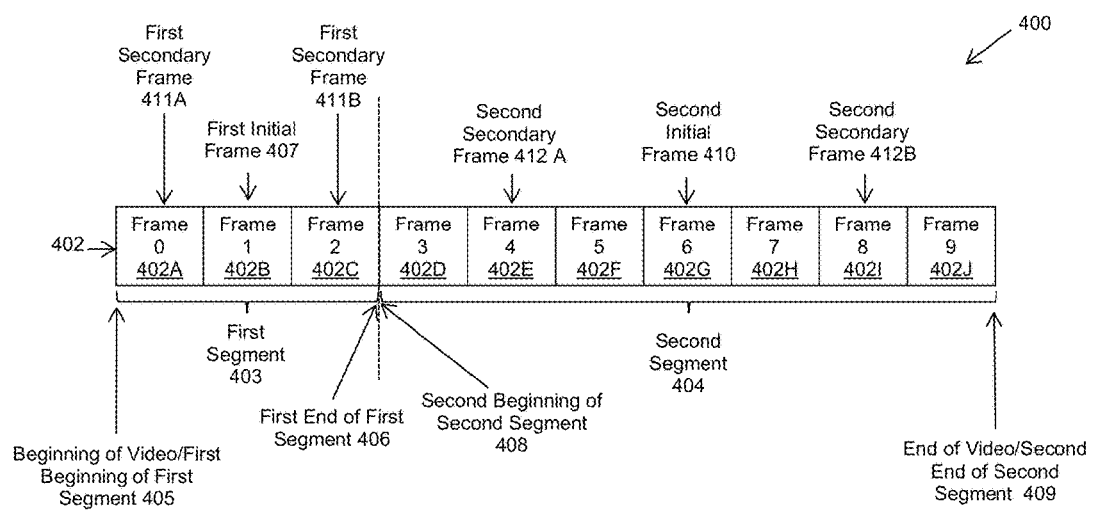
FIG. 4 illustrates secondary frames at secondary frame positions in the sequence of frames of a video, in accordance with one or more implementations.

FIG. 4 illustrates secondary frames at secondary frame positions in the sequence of frames of a video, in accordance with one or more implementations. Video 400 may have multiple frames 0-9 ordered in a sequence 402. Video 400 may have a beginning 405 and an end 409. Video 400 may have a first segment 403, a second segment 404, and/or other segments. First segment 403 may have a first beginning of first segment 405 and a first send of first segment 406. Second segment 404 may have a second beginning of second segment 408 and a second end of second segment 409. First initial frame 407 of first segment 403 may be located at a first initial frame position 402B. Second initial frame 410 of second segment 404 may be located at a second initial frame position 402G. First secondary frames 411 may be located at first secondary frame positions 402A and 402C. The first secondary frame positions may be located at secondary midpoints between first beginning of first segment 405 and first initial frame 407, and between first initial frame 405 and first end of first segment 406. Second secondary frames 411 may be located at second secondary frame positions 402E and 402I. The second secondary frame positions may be located at secondary midpoints between second beginning of second segment 408 and second initial frame 410, and between second initial frame 410 and second end of second segment 409. As such, by way of non-limiting example, a sample frame order determined video 400 for two iterations may include [Frame 1, Frame 6, Frame 0, Frame 2, Frame 4, Frame 8].

Returning to FIG. 1, sample frame order component 110 may be configured to associate the secondary frames with secondary sample positions in a sample frame order. The first secondary frames, the second secondary frames, and/or other secondary frames may be associated with secondary sample positions in the first sample frame order. The one or more secondary sample positions may come after the primary sample positions and before any other sample positions in the sample frame order. As such, responsive to an analysis of the video according to the sample frame order, the secondary frames associated with the secondary sample positions may be analyzed after the initial frames associated with the primary sample positions and before any other frames associated with the other sample positions. The primary sample positions in the first sample frame order may represent a first depth pass of the video. The secondary sample positions in the first sample frame order may represent a second depth pass of the video.

By way of non-liming example, for a video having two segments including a first segment with 3 frames and a second segment with 7 frames, two initial frames may be determined to be associated with the primary sample positions in the sample frame order, two first secondary frames may be determined to be associated with secondary sample positions in the sample frame order, and/or two second secondary frames may be determined to be associated with secondary sample positions in the sample frame order. As such, continuing the non-limiting example, the sample frame order determined for two iterations may include: [First Initial Frame, Second Initial Frame, First Secondary Frame, First Secondary Frame, Second Secondary Frame, Second Secondary Frame].

One or more of the frames associated with positions in the first sample frame order may be associated within a given level of positions based on an order in which the multiple frames are included in the video and/or an order of the segments. The one or more first secondary frames and/or the second secondary frames may be associated with the secondary sample positions based on an order in which the first secondary frames and the second secondary frames are positioned in the sequence of frames. For example, the first secondary frames may be located before the second secondary frames in the sample frame order by virtue of the second segment coming after the first segment in the video. In some implementations, the first secondary frames closer to the first beginning of first segment and/or the beginning of the video may be associated with earlier positions in the first sample frame order than other first secondary frames. The second secondary frames closer to the second beginning of second segment and/or the beginning of the video may be associated with earlier positions in the first sample frame order than other second secondary frames by virtue of their frame positions coming before the frame positions if the other second secondary frames in the sequence of frames. As such, for example, a frame that occurs (e.g., in the duration of the video) before the other frames determined for a given iteration of a given segment may be associated with a foremost sample frame position within a given level of sample frame positions corresponding to the given iteration of the given segment of the video.

In some implementations, determining the first sample frame order may further include determining one or more tertiary frames. Sample frame order component 110 may be configured to determine first tertiary frames for the first segment, second tertiary frames for the second segment, an/or other tertiary frames for other segments. The one or more tertiary frames may be determined for a third iteration of the first segment, the second segment, and/or other segments. Sample frame order component 110 may be configured to determine one or more first tertiary frames based on a function of frame position in the sequence of frames between one or more of: the first beginning of the first segment and one of the first secondary frames, one of the first secondary frames and the first initial frame, the first initial frame and one of the secondary frames, one of the secondary frames and the first end of the first segment; and/or any other frame position and/or defined positions within the video and/or segment. Sample frame order component 110 may be configured to determine one or more second tertiary frames based on a function of frame position in the sequence of frames between one or more of: the second beginning of the second segment and one of the second secondary frames, one of the second secondary frames and the second initial frame, the second initial frame and one of the secondary frames, one of the secondary frames and the second end of the second segment; and/or any other frame position and/or defined positions within the video and/or segment.

Sample frame order component 110 may be configured to associate the tertiary frames with tertiary sample positions in the first sample frame order. The one or more tertiary sample positions may come after the primary sample positions and the second sample positions, and before any other sample positions in the first sample frame order. Thus, analyzing the video according to the sample frame order may include analyzing the one or more tertiary frames associated with the tertiary sample positions after analyzing the one or more secondary frames associated with the secondary sample positions and after analyzing the initial frame associated with the primary sample positions; and before any other frames associated with the other sample positions.

In some implementations, sample frame order component 110 may be configured to determine a sample frame order based on multiple iterations of the one or more segments determined. The multiple iterations may include a quantity of iterations beyond the first iteration, the second iteration, the third iteration, and/or other iterations for individual ones of the segments. For example, the multiple iterations may further include a fourth iteration, a fifth iteration, a sixth iteration, a seventh iteration, an eight iteration, a ninth iteration, a tenth iteration, and/or any other iteration (e.g., $n^{th}$ iteration). The video may have any number of segments such that individual iterations may be performed any number of times for the segments. The quantity of iterations may indicate a depth of the progressive sample of the video. For example, less than five iterations may indicate a less in-depth sample of the video than five or more iterations.

Determining the first sample frame order may include determining, for individual ones of the quantity of iterations of individual segments, other sets of frames to be associated with other sample positions in the first sample frame order. The other sets of frames may be determined based on a function of frame position in the sequence of frames between a previously determined frame determined during an immediately preceding iteration within the multiple iterations of the given segment, and one or more of: the beginning of the video, the end of the video, another previously determined frame determined during another preceding iteration, and/or any other defined position within the video. In some implementations, one or more segments of a given video may have one or more secondary frames, tertiary frames, and/or other frames that one or more other segments of the video does not have. By way of non-limiting example, if all of the frames in a given segment are associated with positions in a sample frame order but all of the frames in another given segment are not, the iterations may continue and/or stop. As such, one or more frames in one or more of the segments may not be associated with a sample frame position in the sample frame order and/or one or more of the segments may have further iterations performed than other ones of the segments in a given video.

Figure 5:
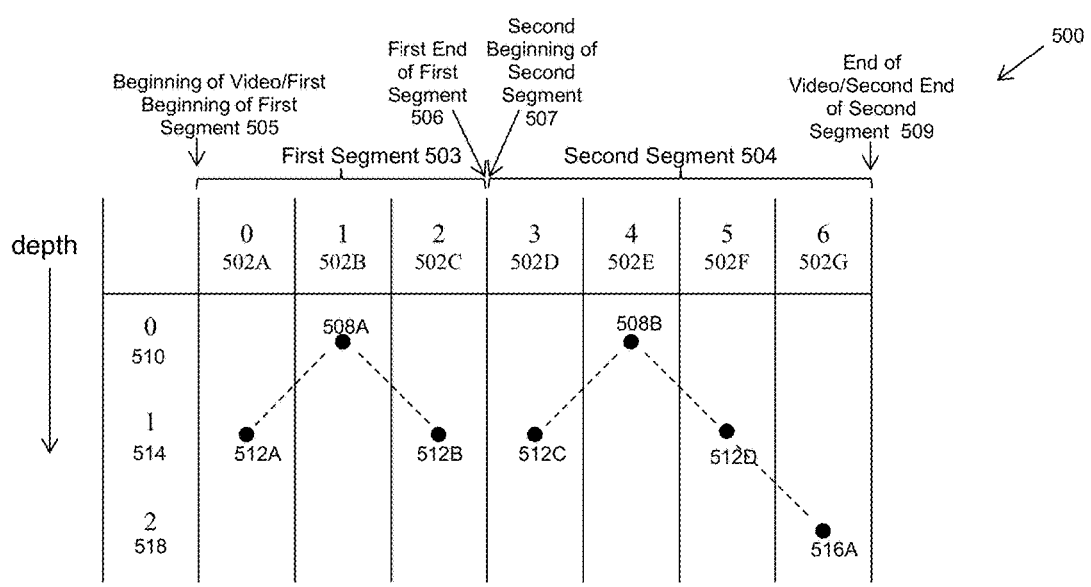
FIG. 5 illustrates an exemplary traversal tree for determining a sample frame order including three iterations, in accordance with one or more implementations.

FIG. 5 illustrates an exemplary traversal tree for determining a sample frame order including three iterations, in accordance with one or more implementations. Traversal tree 500 may represent the sequence of frames 501 of a video having 7 frames and two segments. The two segments may include first segment 503 and second segment 504. First segment 503 may have a first beginning of first segment 505 and/or a first end of first segment 506. First beginning of first segment 505 may be the same as the beginning of the video. Second segment 504 may have a second beginning of second segment 507 and/or a second end of second segment 509. Second send of second segment 509 may be the same as the end of the video. First initial frame 508A may be determined for a first iteration of first segment 503 representing zero-depth pass 510 of video. First initial frame 508A may be determined based on a function of frame position in sequence of frames 502 between the first beginning of first segment 505 and the first end of first segment 506. First initial frame 508A may be associated with a primary sample position in a sample frame order. Second initial frame 508B may be determined for a first iteration of second segment 504 representing zero-depth pass 510 of video. Second initial frame 508B may be determined based on a function of frame position in sequence of frames 502 between the second beginning of second segment 507 and the second end of second segment 509. Second initial frame 508B may be associated with a primary sample position in a sample frame order.

First secondary frames 512A and 512B may be determined for a second iteration of first segment 503 representing first-depth pass 514 of the video. Second secondary frames 512C and 512D may be determined for a second iteration of second segment 504 representing first-depth pass 514 of the video. First secondary frames 512A and 512B may be determined based on a function of frame position in sequence of frames 502 between the first beginning of the first segment 505 and the first initial frame position 502B, and between the first initial frame position 502B and the first end of the first segment 506. In some implementations, first secondary frames 512A and 512B may include frame 0 and frame 2 based on their frame positions 502A and 502C being located at secondary midpoints between the first beginning of the first segment 505 and first initial frame position 502B, and first initial frame position 502B and the first end of the first segment 506. Second secondary frames 512C and 512D may be determined based on a function of frame position in sequence of frames 502 between the second beginning of the second segment 507 and the second initial frame position 502E, and between the second initial frame position 502E and the second end of the second segment 509. In some implementations, second secondary frames 512C and 512D may include frame 3 and frame 5 based on their frame positions 502D and 502F being located at, or adjacent to, secondary midpoints between the second beginning of the second segment 507 and second initial frame position 502E, and second initial frame position 502E and the second end of the second segment 509. First secondary frames 512A and 512B, and second secondary frames 512C and 512D may be associated with secondary sample positions in the sample frame order.

Tertiary frames 516 may be determined for a third iteration representing a second-depth pass 518 of the video. Tertiary frames 516 may include one or more first tertiary frames (not pictured) and/or one or more second tertiary frames 516A may be determined. First tertiary frames may be determined based on a function of frame position in the sequence of frames 502 between the first beginning of the first segment 505 and one of the first secondary frames 512A or 512B, one of the first secondary frames 512A or 512B and the first initial frame 508A, the first initial frame 508A and one of the secondary frames 512A or 512B, and one of the secondary frames 512A or 512B and the first end of the first segment 506. One or more second tertiary frames 516A may be determined based on a function of frame position in the sequence of frames 502 between the second beginning of the second segment 507 and one of the second secondary frames 512C or 512D, one of the second secondary frames 512C or 512D and the second initial frame 508B, the second initial frame 508B and one of the secondary frames 512C or 512D, and one of the secondary frames 512C or 512D and the second end of the second segment 509.

In some implementations, the one or more tertiary frames 516 may include frame 6 based on its frame position 502G being located at a tertiary midpoint between the secondary frame position 502F and second end of second segment 509. The one or more tertiary frames 516 may be associated with tertiary sample positions in the sample frame order. The sample frame order for traversal tree 500 may include [Frame 1, Frame 4, Frame 0, Frame 2, Frame 3, Frame 5, Frame 6]. Frames 0-6 of the video may be analyzed according to the sample frame order such that Frame 1 may be analyzed first and/or frame 6 may be analyzed last.

Figure 6:
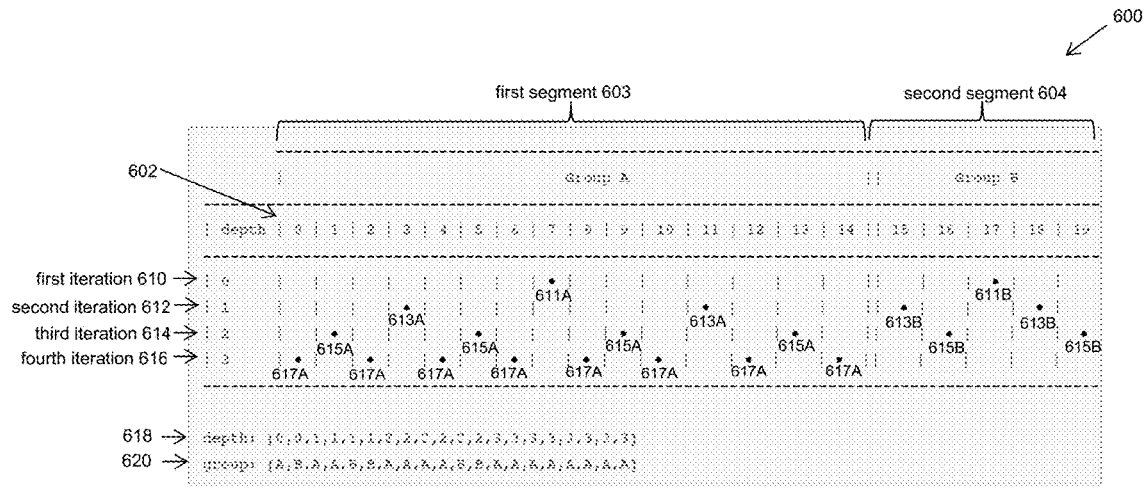
FIG. 6 illustrates an exemplary traversal tree for determining a sample frame order including four iterations, in accordance with one or more implementations.

FIG. 6 illustrates an exemplary traversal tree for determining a sample frame order including four iterations performed, in accordance with one or more implementations. Traversal tree 600 may represent the sequence of frames 602 for a video having 20 frames. One or more initial frames 611 may be determined for a first iteration 610 representing zero-depth pass of the video. First initial frame 611A may be determined for a first iteration 610 of first segment 603. Second initial frame 611B may be determined for a first iteration 610 of second segment 604. One or more secondary frames 613 may be determined for a second iteration 612 representing a first-depth pass of the video. First secondary frames 613A may be determined for second iteration 612 of first segment 603. Second secondary frames 613B may be determined for a second iteration 612 of second segment 604. One or more tertiary frames 615 may be determined for a third iteration 614 representing a second-depth pass of the video. First tertiary frames 615A may be determined for a third iteration 614 of first segment 603. Second tertiary frames 615B may be determined for a third iteration 614 of second segment 604. One or more quaternary frames 617 (e.g., other frames) may be determined for a fourth iteration 616 representing a third-depth pass of the video. First quaternary frames 617A may be determined for a fourth iteration 616 of first segment 603. Second quaternary frames (not picture) may be determined for a fourth iteration of second segment 604 responsive to second segment 604 having more than 20 frames (not illustrated).

A sample frame order for the video represented by sequence of frames 602 may include [7, 17, 3, 11, 15, 18, 1, 5, 9, 13, 16, 19, 0, 2, 4, 6, 8, 10, 12, 14]. Depth sample order 618 may indicate a depth of the video represented at each point in the determined sample frame order. Segment sample order 620 may indicate which segment is represented at each point in the determined sample frame order (e.g., wherein Group A is first segment 603 and Group B is second segment 604). Determining a sample frame order including iterations performed on individual ones of the segments of the video enables frames in second segment 604 to be associated with earlier positions in the sample frame order. As such, by way of non-limiting example, second segment 604 may effectively be weighted even though it is smaller than first segment 603.

Figure 7:
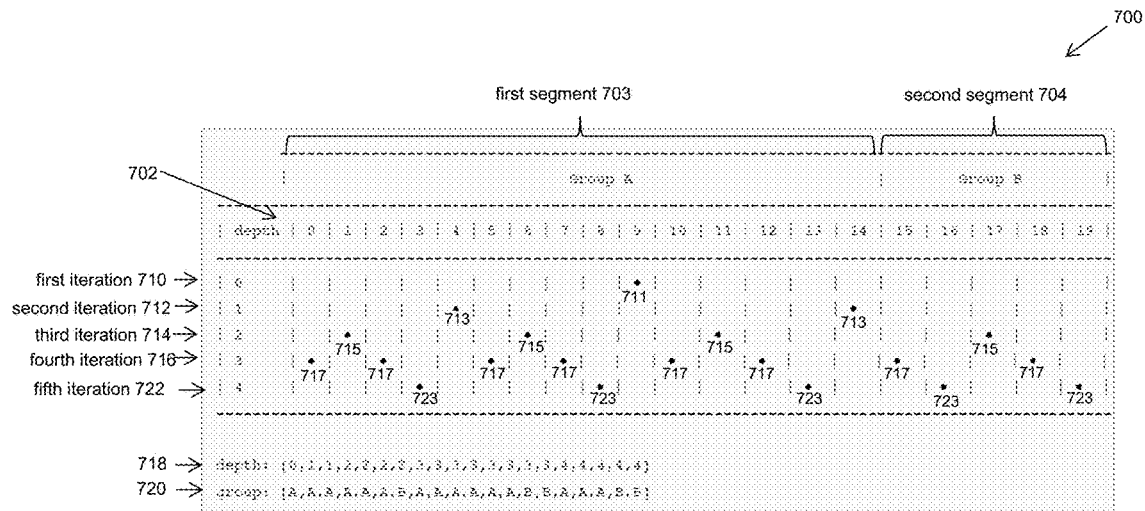
FIG. 7 illustrates an alternative traversal tree for determining a sample frame order including four iterations performed on the video as a whole, in accordance with one or more implementations.

FIG. 7 illustrates an alternative traversal tree for determining a sample frame order including four iterations performed on the video as a whole rather than on individual ones of the segments of the video. Traversal tree 700 may represent the sequence of frames 702 for a video having 20 frames. The video represented by sequence of frames 702 may include first segment 703 and second segment 704. Initial frame 711 may be determined for a first iteration 710 representing zero-depth pass of the video. One or more secondary frames 713 may be determined for a second iteration 712 representing a first-depth pass of the video. One or more tertiary frames 715 may be determined for a third iteration 714 representing a second-depth pass of the video. One or more quaternary frames 717 (e.g., other frames) may be determined for a fourth iteration 717 representing a third-depth pass of the video. One or more other frames 723 may be determined for a fifth iteration 723 representing a fourth-depth pass of the video.

A sample frame order for the video represented by sequence of frames 702 may include [9, 4, 14, 1, 6, 11, 17, 0, 2, 5, 7, 10, 12, 15, 18, 3, 8, 13, 16, 19]. Depth sample order 718 may indicate a depth of the video represented at each point in the determined sample frame order. Segment sample order 720 may indicate which segment is represented at each point in the determined sample frame order (e.g., wherein Group A is first segment 703 and Group B is second segment 704). Determining a sample frame order including iterations performed on the video as a whole rather than individual ones of the segments of the video causes frames from second segment 704 to be determined in later iterations (not until the third iteration) and/or appear later in the sample frame order. As such, by way of non-limiting example, second segment 704 and/or other smaller segments may not be represented effectively (e.g., weighted) and/or early enough in the sample frame order without performing the iterations on individual ones of the segments of the video rather than the video as a whole.

Returning to FIG. 1, interval component 112 may be configured to determine an interval between two or more frame positions determined for one or more iterations of one or more segments. Interval component 112 may be configured to determine an interval between a frame position in the sequence of frames determined for a given iteration and another frame position in the sequence of frames determined for an iteration immediately preceding the given iteration.

Interval component 112 may be configured to determine whether the interval is at least equal to or less than a threshold interval. The threshold interval may include a time period, a number of frames, and/or any other representation of distance within a video between two frame positions determined for one or more intervals and associated with one or more positions in the sample frame order at which the multiple iterations may end and the sample frame order may be considered complete. In some implementations, the threshold interval may be set, determined, and/or adjusted by one or more users. The threshold interval may affect the quantity of iterations required to determine the sample frame order.

The interval may be a time period between two frame positions in the sequence of frames for frames associated with two consecutive sample frame positions in the sample frame order. By way of non-limiting example, determining an interval between sample frames (e.g., frames associated with sample positions in a sample frame order) may enable the system to stop traversing at a particular depth according to some accuracy and/or temporal heuristic (e.g., a threshold interval, etc.). The interval may indicate how close together frames associated with positions in a given frame order are. As such, the interval may indicate a depth of accuracy of the sample frame order representing a video. A smaller interval may indicate more frames associated with sample frame positions in the sample frame order, and/or a more in-depth sample of the video compared to a larger interval.

Interval component 112 may be configured to determine whether the interval is equal to or less than a threshold interval. The video may be analyzed and/or a first feature determined responsive to the interval being equal to or less than the threshold interval. The interval being at least equal to or less than the threshold interval may indicate the determination of the sample frame order is complete and/or sufficient for a desired depth sample of the video (e.g., for the depth of analysis determined and/or set by the user via determining and/or setting the threshold interval). By way of non-liming example, a smaller threshold interval may indicate that the frames associated with positions in the sample frame order are closer together in the sequence of frames providing a more in-depth sample representation of the video compared to frames associated with positions in the sample frame order being farther apart in the sequence of frames.

Analysis component 114 may be configured to determine one or more features of the video. The one or more features of the video may be determined based on an analysis of the video in the determined sample frame order. In some implementations, a first feature of the video may be determined by analysis component 114 based on an analysis of the frames in the video performed on the frames in the first sample frame order. An analysis of the frames in the video performed on the frames in the first sample frame order may include processing the frames in accordance with the first sample frame order to determine information associated with the frames. In some implementations, for example, a feature of a video determined by analyzing the frames in the sample frame order may represent the video as a whole based while only requiring analysis of the frames in the sample frame order.

The feature(s) of the video determined by analysis component 114 may include one or more of: a goodness score, a motion metric, a shape metric, a face metric, a persistence metric, an interest score, and/or other features of the video. A goodness score may represent the quality of a given frame and/or video. By way of non-limiting example, a goodness score may be determined based on one or more of: resolution, brightness, contrast, color histogram, blur/sharpness, number of human faces present, the generating/capturing device, the motion of the camera and/or the motion intent (e.g., pan left, pan right, track an object or person, etc.), the detection of a scene (e.g., forest, beach, city, etc.), the detection of an activity (e.g., surfing, mountain biking, etc.) and/or other factors. The interest score may characterize "interestingness" of one or more frames." "Interestingness" may be based on one or more parameters including quality, scene features (e.g., feature points, objects, faces, colors, scene compilation, and/or other scene features), capture parameters (e.g., a resolution, a frame rate, one or more lens settings, and/or other capture parameters), and/or other parameters.

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

The server 102, computing platforms 122, external resources 124, and/or other entities may be operatively linked via one or more electronic communication links. For example, such electronic communication links may be established, at least in part, via one or more networks 120. In some implementations, a network 120 may comprise the Internet and/or may employ other communications technologies and/or protocols. By way of non-limiting example, network 120 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over network 120 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 100 may use custom and/or dedicated data communications technologies instead of, or in addition to, the ones described above.

It will be appreciated that this is not intended to be limiting and that the scope of this disclosure includes implementations in which server 102, computing platforms 122, external resources 124, and/or other entities may be operatively linked via some other communication media.

External resources 124 may include sources of information, hosts, and/or other entities outside of system 100, external entities participating with system 100, and/or other resources. In some implementations, some or all of the functionality attributed herein to external resources 124 may be provided by resources included in system 100.

The server 102 may include electronic storage 118. The server 102 may include communication lines or ports to enable the exchange of information with a network and/or other entities. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). The electronic storage 118 may store software algorithms, information determined by processor(s) 104, information received from server 102, information received from computing platforms 122, and/or other information that enables server 102 to function as described herein.

Processor(s) 104 may be configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 106, 108, 110, 112, 114, and/or 116. Processor 104 may be configured to execute components 106, 108, 110, 112, 114, and/or 116 by software; hardware; firmware; some combination of software, hardware, and/or firmware; and/or other mechanisms for configuring processing capabilities on processor 104.

It should be appreciated that although components 106, 108, 110, 112, 114, and/or 116 are illustrated in FIG. 1 as being co-located within a single processing unit, in implementations in which processor 104 includes multiple processing units, one or more of components 106, 108, 110, 112, 114, and/or 116 may be located remotely from the other components. The description of the functionality provided by the different components 106, 108, 110, 112, 114, and/or 116 described above is for illustrative purposes and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, 116, and/or other components. As another example, processor 104 may be configured to execute one or more additional components that may perform some or all of the functionality attributed below to one of components 106, 108, 110, 112, 114, and/or 116.

Figure 8:
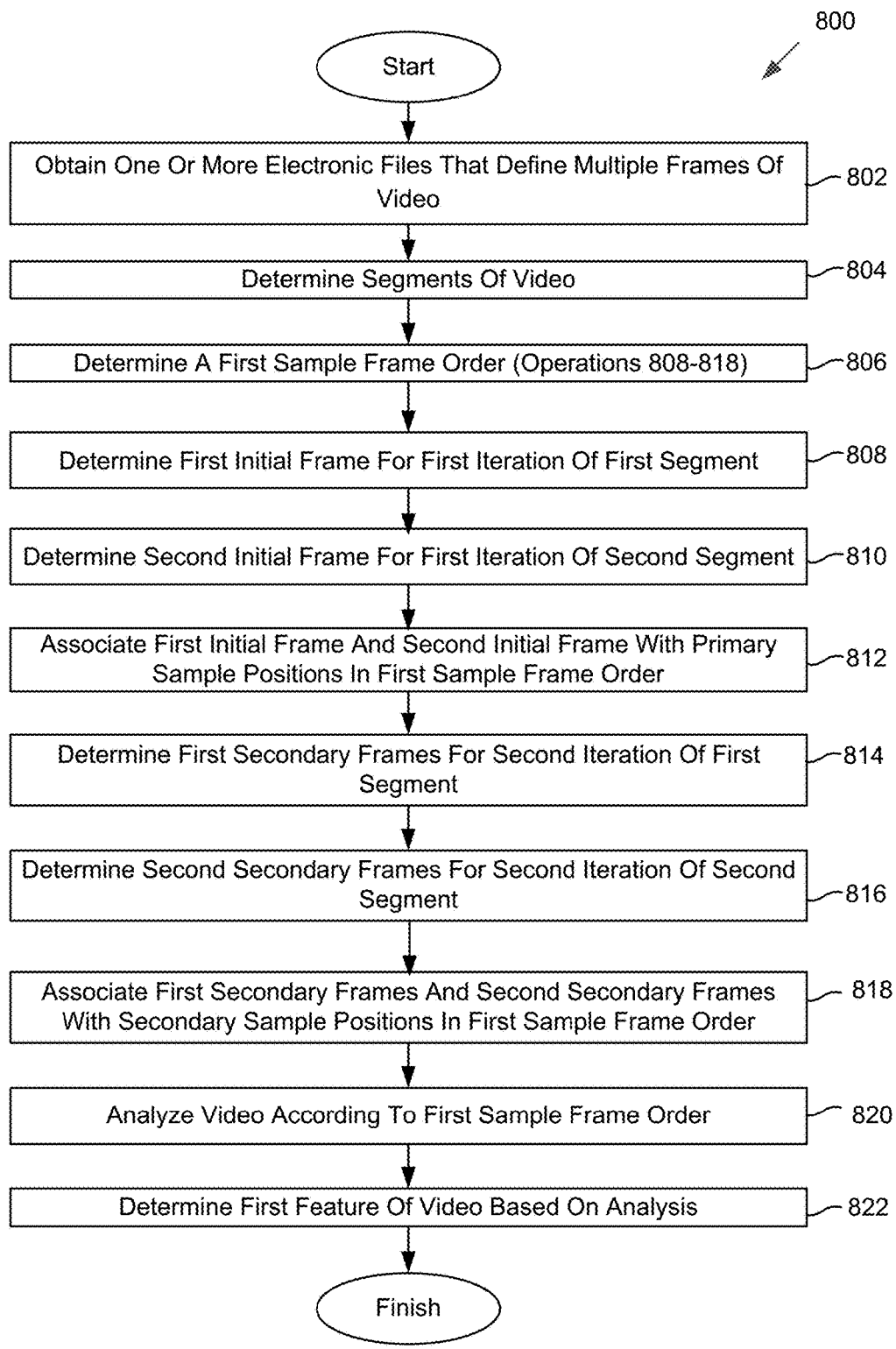
FIG. 8 illustrates a method for determining a sample frame order for analyzing a video, in accordance with one or more implementations, in accordance with one or more implementations.

FIG. 8 illustrates a method for determining a sample frame order for analyzing a video, in accordance with one or more implementations, in accordance with one or more implementations. The operations of method 800 presented below are intended to be illustrative. In some implementations, method 800 may be accomplished with one or more additional operations not described, and/or without one or more of the operations discussed. In some implementations, two or more of the operations may occur substantially simultaneously.

In some implementations, method 800 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 800 in response to instructions stored electronically on one or more electronic storage mediums. The one or more processing devices may include one or more devices configured through hardware, firmware, and/or software to be specifically designed for execution of one or more of the operations of method 800.

Referring to FIG. 8 and method 800, at operation 802, one or more electronic files may be obtained. The one or more electronic files may define video content included in the video. The video may have multiple frames ordered in a sequence from a beginning to an end. In some implementations, operation 802 may be performed by a video component the same as or similar to video component 106 (shown in FIG. 1 and described herein).

At operation 804, segments of the video may be determined. Segments of the video may be determined based on an analysis of the multiple frames of the video. A first segment may be determined. The first segment have a first beginning and a first end. A second segment may be determined. The second segment may have a second beginning and a second end. In some implementations, operation 804 may be performed by a segmentation component the same as or similar to segmentation component 108 (shown in FIG. 1 and described herein).

At operation 806, a first sample frame order may be determined. The first sample frame order may be for analyzing the video. The first sample frame order may be determined based on multiple iterations performed on individual ones of the segments of the video. In some implementations, operation 806 may be performed by a sample frame order component the same as or similar to sample frame order component 110 (shown in FIG. 1 and described herein).

At operation 808, a first initial frame may be determined. The first initial frame may be determined for a first iteration of the first segment. The first initial frame may be determined based on a function of frame position in the sequence of frames between the first beginning of the first segment and the first end of the first segment. The first initial frame may have a first initial frame position in the sequence of frames. In some implementations, operation 808 may be performed by a sample frame order component the same as or similar to sample frame order component 110 (shown in FIG. 1 and described herein).

At operation 810, a second initial frame may be determined. The second initial frame may be determined for a first iteration of the second segment. The second initial frame may be determined based on a function of frame position in the sequence of frames between the second beginning of the second segment and the second end of the second segment. The second initial frame may have a second initial frame position in the sequence of frames. In some implementations, operation 810 may be performed by a sample frame order component the same as or similar to sample frame order component 110 (shown in FIG. 1 and described herein).

At operation 812, the first initial frame, the second initial frame, and/or other initial frames may be associated with a primary sample positions in a first sample frame order. The first sample frame order may be different from the sequence of frames. In some implementations, operation 812 may be performed by a sample frame order component the same as or similar to sample frame order component 110 (shown in FIG. 1 and described herein).

At operation 814, first secondary frames may be determined. First secondary frames may be determined for a second iteration of the first segment. First secondary frames may be determined based on a function of frame position in the sequence of frames between the first beginning of the first segment and the first initial frame position, and/or between the first initial frame position and the first end of the first segment. In some implementations, operation 814 may be performed by a sample frame order component the same as or similar to sample frame order component 110 (shown in FIG. 1 and described herein).

At operation 816, second secondary frames may be determined. First secondary frames may be determined for a second iteration of the second segment. First secondary frames may be determined based on a function of frame position in the sequence of frames between the second beginning of the second segment and the second initial frame position, and/or between the second initial frame position and the second end of the second segment. In some implementations, operation 816 may be performed by a sample frame order component the same as or similar to sample frame order component 110 (shown in FIG. 1 and described herein).

At operation 818, the first secondary frames, the second secondary frames, and/or other secondary frames may be associated with secondary sample positions in the first sample frame order. In some implementations, operation 818 may be performed by a sample frame order component the same as or similar to sample frame order component 110 (shown in FIG. 1 and described herein).

At operation 820, the video may be analyzed according to the first sample frame order. The video may be analyzed to determine one or more features of the video. In some implementations, operation 820 may be performed by an analysis component the same as or similar to analysis component 114 (shown in FIG. 1 and described herein).

At operation 822, a first feature of the video may be determined. A first feature of the video may be determined based on an analysis of the frames in the video performed on the frames in the first sample frame order. In some implementations, operation 818 may be performed by a feature component the same as or similar to feature component 116 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:
1. A system configured to determine a sample frame order for analyzing a video, the system comprising:
    one or more processors configured by machine-readable instructions to:

obtain one or more electronic files that define multiple frames of the video, the multiple frames of the video being ordered in a sequence from a beginning to an end;

determine segments of the video based on an analysis of the multiple frames of the video, such that a first segment having a first beginning and a first end, and a second segment having a second beginning and a second end, are determined;

determine a first sample frame order for analyzing the video based on multiple iterations performed on individual ones of the segments of the video, wherein determining the first sample frame order includes:

determining, for a first iteration of the first segment, a first initial frame based on a function of frame position in the sequence of frames between the first beginning of the first segment and the first end of the first segment, the first initial frame having a first initial frame position in the sequence of frames;

determining, for the first iteration of the second segment, a second initial frame based on a function of frame position in the sequence of frames between the second beginning of the second segment and the second end of the second segment, the second initial frame having a second initial frame position in the sequence of frames;

associating the first initial frame and the second initial frame with primary sample positions in a first sample frame order that is different from the sequence of frames;

determining, for a second iteration of the first segment, first secondary frames based on a function of frame position in the sequence of frames between the first beginning of the first segment and the first initial frame position, and between the first initial frame position and the first end of the first segment;

determining, for a second iteration of the second segment, second secondary frames based on a function of frame position in the sequence of frames between the second beginning of the second segment and the second initial frame position, and between the second initial frame position and the second end of the second segment; and associating the first secondary frames and the second secondary frames with secondary sample positions in the first sample frame order;

analyze the video according to the first sample frame order to determine one or more features of the video;

determine a first feature of the video based on a feature analysis of the frames in the video performed on the frames in the first sample frame order identify one or more frames from the multiple frames based on the first feature; and output the one or more frames identified.

2. The system of claim 1, wherein the first initial frame is a first middle frame of the first segment such that determining the first initial frame based on the function of frame position in the sequence of frames between the first beginning of the first segment and the first end of the first segment includes determining a frame in the sequence of frames that is an equal number of frames from both the first beginning of the first segment and the first end of the first segment, and wherein the second initial frame is a second middle frame of the second segment such that determining the second initial frame based on the function of frame position in the sequence of frames between the second beginning of the second segment and the second end of the second segment includes determining a frame in the sequence of frames that is an equal number of frames from both the second beginning of the second segment and the second end of the second segment.

3. The system of claim 1, wherein the first secondary frames have first secondary frame positions in the sequence of frames, the first secondary frame positions located at, or adjacent to, midpoints between: the first beginning of the first segment and the first initial frame position, and the first initial frame position and the first end of the first segment, and wherein the second secondary frames have second secondary frame positions in the sequence of frames, the second secondary frame positions located at, or adjacent to, midpoints between: the second beginning of the second segment and the second initial frame position, and the second initial frame position and the second end of the second segment.

4. The system of claim 1, wherein the first feature includes one or more of a goodness score, a motion metric, a shape metric, a face metric, and/or a persistence metric.

5. The system of claim 1, wherein the multiple iterations include a quantity of iterations beyond the first iteration and the second iteration, and wherein determining the first sample frame order further includes determining, for individual ones of the quantity of iterations of individual ones of the segments, other sets of frames to be associated with other sample positions in the first sample frame order based on a function of frame position in the sequence of frames between a position of a previously determined frame determined during an immediately preceding iteration within the multiple iterations of a segment, and one of the first beginning of the first segment, the second beginning of the second segment, the first end of the first segment, the second end of the second segment, or another position of another previously determined frame determined during a second preceding iteration that immediately preceded the immediately preceding iteration of the segment.

6. The system of claim 1, wherein the segments of the video are determined based on similarity between neighboring frames in the sequence such that individual ones of the segments of the video comprise multiple similar sequential frames and determining the segments of the video includes determining the similarity between the neighboring frames in the sequence.

7. The system of claim 1, wherein the primary sample positions in the first sample frame order represent a first depth pass of the video and the secondary sample positions in the first sample frame order represent a second depth pass of the video.

8. The system of claim 1, wherein determining the first sample frame order further includes:

determining, for a third iteration of the first segment, first tertiary frames based on a function of frame position in the sequence of frames between the first beginning of the first segment and one of the first secondary frames, one of the first secondary frames and the first initial frame, the first initial frame and one of the secondary frames, and one of the secondary frames and the first end of the first segment;

determining, for a third iteration of the second segment, second tertiary frames based on a function of frame position in the sequence of frames between the second beginning of the second segment and one of the second secondary frames, one of the second secondary frames and the second initial frame, the second initial frame and one of the secondary frames, and one of the secondary frames and the second end of the second segment; and associating the first and the second tertiary frames with tertiary sample positions in the first sample frame order.

9. The system of claim 1, wherein the one or more processors are further configured by machine-readable instructions to:

determine an interval between a frame position in the sequence of frames of a frame determined for a given iteration and another frame position in the sequence of frames determined for an iteration immediately preceding the given iteration;

determine whether the interval is at least equal to or less than a threshold interval such that the video is analyzed and the first feature is determined responsive to the interval being at least equal to or less than the threshold interval.

10. The system of claim 1, wherein the secondary sample positions come after the primary sample positions and before any other sample positions in the first sample frame order such that the first secondary frames and the second secondary frames associated with the secondary sample positions are analyzed after the first initial frame and the second initial frame associated with the primary sample positions and before any other frames associated with the other sample positions.

11. A method for determining a sample frame order for analyzing a video, the method being implemented in a computer system that includes one or more processors configured by machine-readable instructions, the method comprising:

obtaining one or more electronic files that define multiple frames of the video, the multiple frames of the video being ordered in a sequence from a beginning to an end;

determining segments of the video based on an analysis of the multiple frames of the video, such that a first segment having a first beginning and a first end, and a second segment having a second beginning and a second end, are determined;

determining a first sample frame order for analyzing the video based on multiple iterations performed on individual ones of the segments of the video, wherein determining the first sample frame order includes:

determining, for a first iteration of the first segment, a first initial frame based on a function of frame position in the sequence of frames between the first beginning of the first segment and the first end of the first segment, the first initial frame having a first initial frame position in the sequence of frames;

determining, for the first iteration of the second segment, a second initial frame based on a function of frame position in the sequence of frames between the second beginning of the second segment and the second end of the second segment, the second initial frame having a second initial frame position in the sequence of frames;

associating the first initial frame and the second initial frame with primary sample positions in a first sample frame order that is different from the sequence of frames;

determining, for a second iteration of the first segment, first secondary frames based on a function of frame position in the sequence of frames between the first beginning of the first segment and the first initial frame position, and between the first initial frame position and the first end of the first segment;

determining, for a second iteration of the second segment, second secondary frames based on a function of frame position in the sequence of frames between the second beginning of the second segment and the second initial frame position, and between the second initial frame position and the second end of the second segment; and associating the first secondary frames and the second secondary frames with secondary sample positions in the first sample frame order;

analyzing the video according to the first sample frame order to determine one or more features of the video;

determining a first feature of the video based on a feature analysis of the frames in the video performed on the frames in the first sample frame order identifying one or more frames from the multiple frames based on the first feature; and outputting the one or more frames identified.

12. The method of claim 11, wherein the first initial frame is a first middle frame of the first segment such that determining the first initial frame based on the function of frame position in the sequence of frames between the first beginning of the first segment and the first end of the first segment includes determining a frame in the sequence of frames that is an equal number of frames from both the first beginning of the first segment and the first end of the first segment, and wherein the second initial frame is a second middle frame of the second segment such that determining the second initial frame based on the function of frame position in the sequence of frames between the second beginning of the second segment and the second end of the second segment includes determining a frame in the sequence of frames that is an equal number of frames from both the second beginning of the second segment and the second end of the second segment.

13. The method of claim 11, wherein the first secondary frames have first secondary frame positions in the sequence of frames, the first secondary frame positions located at, or adjacent to, midpoints between: the first beginning of the first segment and the first initial frame position, and the first initial frame position and the first end of the first segment, and wherein the second secondary frames have second secondary frame positions in the sequence of frames, the second secondary frame positions located at, or adjacent to, midpoints between: the second beginning of the second segment and the second initial frame position, and the second initial frame position and the second end of the second segment.

14. The method of claim 11, wherein the first feature includes one or more of a goodness score, a motion metric, a shape metric, a face metric, and/or a persistence metric.

15. The method of claim 11, wherein the multiple iterations include a quantity of iterations beyond the first iteration and the second iteration, and wherein determining the first sample frame order further includes determining, for individual ones of the quantity of iterations of individual ones of the segments, other sets of frames to be associated with other sample positions in the first sample frame order based on a function of frame position in the sequence of frames between a position of a previously determined frame determined during an immediately preceding iteration within the multiple iterations of a segment, and one of the first beginning of the first segment, the second beginning of the second segment, the first end of the first segment, the second end of the second segment, or another position of another previously determined frame determined during a second preceding iteration that immediately preceded the immediately preceding iteration of the segment.

16. The method of claim 11, wherein the segments of the video are determined based on similarity between neighboring frames in the sequence such that individual ones of the segments of the video comprise multiple similar sequential frames and determining the segments of the video includes determining the similarity between the neighboring frames in the sequence.

17. The method of claim 11, wherein the primary sample positions in the first sample frame order represent a first depth pass of the video and the secondary sample positions in the first sample frame order represent a second depth pass of the video.

18. The method of claim 11, wherein determining the first sample frame order further includes:
   determining, for a third iteration of the first segment, first tertiary frames based on a function of frame position in the sequence of frames between the first beginning of the first segment and one of the first secondary frames, one of the first secondary frames and the first initial frame, the first initial frame and one of the secondary frames, and one of the secondary frames and the first end of the first segment;
   determining, for a third iteration of the second segment, second tertiary frames based on a function of frame position in the sequence of frames between the second beginning of the second segment and one of the second secondary frames, one of the second secondary frames and the second initial frame, the second initial frame and one of the secondary frames, and one of the secondary frames and the second end of the second segment; and
   associating the first and the second tertiary frames with tertiary sample positions in the first sample frame order.

19. The method of claim 11, further comprising:
   determining an interval between a frame position in the sequence of frames of a frame determined for a given iteration and another frame position in the sequence of frames determined for an iteration immediately preceding the given iteration;
   determining whether the interval is at least equal to or less than a threshold interval such that the video is analyzed and the first feature is determined responsive to the interval being at least equal to or less than the threshold interval.

20. The method of claim 11, wherein the secondary sample positions come after the primary sample positions and before any other sample positions in the first sample frame order such that the first secondary frames and the second secondary frames associated with the secondary sample positions are analyzed after the first initial frame and the second initial frame associated with the primary sample positions and before any other frames associated with the other sample positions.

* * * * *